United States Patent
Issa et al.

(10) Patent No.: US 7,933,972 B1
(45) Date of Patent: Apr. 26, 2011

(54) METHOD AND SYSTEM FOR ORGANIZING CATEGORIES OF CONTENT IN A DISTRIBUTED NETWORK

(75) Inventors: Alfredo C. Issa, Apex, NC (US); Jens Hillen, Peterborough, NH (US)

(73) Assignee: Qurio Holdings, Inc., Raleigh, NC (US)

( * ) Notice: Subject to any disclaimer, the term of this patent is extended or adjusted under 35 U.S.C. 154(b) by 1158 days.

(21) Appl. No.: 11/241,083

(22) Filed: Sep. 29, 2005

(51) Int. Cl.
G06F 15/16 (2006.01)
G06F 17/00 (2006.01)
G06F 7/00 (2006.01)
G06F 17/30 (2006.01)

(52) U.S. Cl. ........ 709/219; 709/200; 715/233; 707/802; 707/781

(58) Field of Classification Search .................. 709/200, 709/217–229; 707/102, 200, 802, 781, 10; 715/233
See application file for complete search history.

(56) References Cited

U.S. PATENT DOCUMENTS

| | | | |
|---|---|---|---|
| 6,324,521 B1 | 11/2001 | Shiota et al. | |
| 6,577,311 B1 | 6/2003 | Crosby et al. | |
| 6,583,799 B1 | 6/2003 | Manolis et al. | |
| 6,636,854 B2 | 10/2003 | Dutta et al. | |
| 6,675,205 B2 | 1/2004 | Meadway et al. | |
| 6,742,023 B1 * | 5/2004 | Fanning et al. | 709/219 |
| 6,757,684 B2 | 6/2004 | Svendsen et al. | |
| 6,791,702 B2 | 9/2004 | Tanaka | |
| 6,813,618 B1 | 11/2004 | Loui et al. | |
| 6,870,547 B1 | 3/2005 | Crosby et al. | 345/619 |
| 6,904,185 B1 | 6/2005 | Wilkins et al. | 382/311 |
| 6,938,042 B2 | 8/2005 | Aboulhosn et al. | |
| 6,954,543 B2 | 10/2005 | Svendsen et al. | |
| 7,194,679 B1 * | 3/2007 | Green | 715/233 |
| 2001/0050684 A1 | 12/2001 | Smith | |
| 2002/0065844 A1 | 5/2002 | Robinson et al. | 715/500 |
| 2002/0073075 A1 | 6/2002 | Dutta et al. | |
| 2002/0093678 A1 | 7/2002 | Skidgel et al. | |
| 2002/0103813 A1 | 8/2002 | Frigon | 707/104.1 |
| 2002/0112001 A1 | 8/2002 | Sutherland et al. | 709/203 |
| 2002/0120757 A1 | 8/2002 | Sutherland et al. | |
| 2002/0186402 A1 | 12/2002 | Jackson et al. | |
| 2003/0028617 A1 * | 2/2003 | Taylor | 709/217 |
| 2003/0058275 A1 | 3/2003 | Pilu et al. | 715/751 |

(Continued)

FOREIGN PATENT DOCUMENTS

JP 2004-259249 9/2004

(Continued)

OTHER PUBLICATIONS

Baker, Loren, "Flickr Photo Sharing Service Acquired by Yahoo," Editor, 2 pgs.

(Continued)

*Primary Examiner* — Ian N Moore
*Assistant Examiner* — Kiet Tang
(74) *Attorney, Agent, or Firm* — Withrow & Terranova, PLLC

(57) ABSTRACT

A method for organizing categories of digital content in a peer-to-peer computer network includes automatically collecting tag metadata when a user creates a tag for digital content stored in a peer computer system. Once the tag is created and the tag metadata is collected, both the tag and the tag metadata are stored in a server that is accessible to each of the peer computer systems. Here, the tag is automatically classified by its tag metadata such that the digital content can be accessed based on its tag metadata.

10 Claims, 2 Drawing Sheets

U.S. PATENT DOCUMENTS

| | | | |
|---|---|---|---|
| 2003/0063770 A1 | 4/2003 | Svendsen et al. | 382/100 |
| 2003/0097410 A1 | 5/2003 | Atkins et al. | 709/206 |
| 2003/0117642 A1 | 6/2003 | Haraguchi | 358/1.15 |
| 2003/0131002 A1 | 7/2003 | Gennetten et al. | 707/10 |
| 2003/0187673 A1 | 10/2003 | Needham et al. | |
| 2003/0236831 A1 | 12/2003 | Ortiz et al. | 709/204 |
| 2003/0236832 A1 | 12/2003 | McIntyre et al. | |
| 2004/0046868 A1 | 3/2004 | Anderson et al. | |
| 2004/0070678 A1 | 4/2004 | Toyama et al. | |
| 2004/0109197 A1 | 6/2004 | Gardaz et al. | 358/1.15 |
| 2004/0133589 A1* | 7/2004 | Kiessig et al. | 707/102 |
| 2004/0139172 A1 | 7/2004 | Svendsen et al. | 709/219 |
| 2004/0172419 A1 | 9/2004 | Morris et al. | 707/200 |
| 2004/0172440 A1* | 9/2004 | Nakajima et al. | 709/200 |
| 2004/0201709 A1 | 10/2004 | McIntyre et al. | |
| 2004/0205168 A1 | 10/2004 | Asher | 709/220 |
| 2004/0215625 A1 | 10/2004 | Svendsen et al. | 707/10 |
| 2005/0033806 A1 | 2/2005 | Harvey et al. | |
| 2005/0044147 A1 | 2/2005 | Yap | 709/205 |
| 2005/0052685 A1 | 3/2005 | Herf et al. | 358/1.15 |
| 2005/0055455 A1 | 3/2005 | Asher | 709/231 |
| 2005/0060299 A1 | 3/2005 | Filley et al. | 707/3 |
| 2005/0080846 A1 | 4/2005 | McCleskey et al. | 709/202 |
| 2005/0120133 A1 | 6/2005 | Slack-Smith | 709/234 |
| 2005/0131871 A1 | 6/2005 | Howard et al. | 707/3 |
| 2005/0190273 A1 | 9/2005 | Toyama et al. | |
| 2006/0044599 A1 | 3/2006 | Lipowitz et al. | |
| 2006/0149745 A1* | 7/2006 | Mengerink | 707/10 |

FOREIGN PATENT DOCUMENTS

| | | |
|---|---|---|
| WO | WO 00/11871 A1 | 3/2000 |
| WO | WO 02/08926 A1 | 1/2002 |

OTHER PUBLICATIONS

Brighton, Guy, "Photosharing Gets Boost From Yahoo?" Web & Tech, May 26, 2005, 1 pg.

DeFigueiredo, Dimitri do B., "Unleashing the Power of Digital Goods: Enabling New Business Models for the Music Industry," Aug. 2003, pp. 1-26.

Malhotra, Amit, "P2P Photo Sharing: Qurio," Nov. 4, 2004, 1 pg.

Peer-to-Peer News, The Week in Review, May 8, 2004, pp. 1-62.

Vroegindeweij, Sander, "My Pictures: Informal Image Collections," Information Infrastructure Laboratory, HP Laboratories, Nov. 5, 2003, pp. 1-85.

* cited by examiner

METHOD AND SYSTEM FOR ORGANIZING CATEGORIES OF CONTENT IN A DISTRIBUTED NETWORK

CROSS-REFERENCE TO RELATED APPLICATIONS

The present application is related to co-pending U.S. patent application Ser. No. 10/346,298, entitled "METHOD AND SYSTEM FOR REQUESTING IMAGE PRINTS IN AN ONLINE PHOTOSHARING SYSTEM," filed on Jan. 15, 2003, and assigned to the assignee of the present application. The related application is incorporated herein by reference in its entirety.

FIELD OF INVENTION

The present invention relates to distributed networks, and more particularly to a method and system for organizing categories of digital content in a peer-to-peer distributed network.

BACKGROUND OF THE INVENTION

Over the past several years, online photo management and sharing have become widely popular services offered by a variety of service providers. Typically, users upload digital images to a website, where they are centrally stored on a server and viewable by guests over the Internet. Typically, the service provider allows the user to group his or her uploaded photos into one or more photo albums. Alternatively, users can associate one or more keywords with an image, thereby creating one or more "tags" for the image. For example, an image of a dog at Yosemite can be associated with the keyword "dog" and the keyword "Yosemite," thereby creating two tags for the image. The tag can then be used to sort the image into a category, e.g., "dog" and/or "Yosemite," for viewing or sharing. Because an image can have more than one tag, the image can be in more than one category on the server.

This centralized approach to photo management and sharing, however, presents some disadvantages. In particular, users are required to upload images or other digital content to the website, which can be time consuming. Moreover, the server requires extensive storage capacity to store the images of all the users, which can become expensive.

To address some of these concerns, the assignee of the present invention has developed a distributed web-based peer-to-peer communication environment in which all workstations and computers (peers) in a network store digital content, e.g., images, locally and act as servers to other users on the network. Each peer allows the user of the peer computer to share images stored on the computer with others in the network through a web browser without having to upload the pictures to a web site. A server at a central site provides supporting services to the peers as well as a path through which a visiting computer, i.e., one not belonging to the peer-to-peer network, can access images from the peers via its web browser. The central server also provides additional functionality, such as coordinating the peers, and providing proxy services for the peers, for example.

FIG. 1 is a block diagram illustrating the peer-to-peer (P2P) network system described above. The P2P network 100 includes a central site 40 that includes a peer server 36, and multiple peer computer systems 24a-24c (collectively referred to as peers 24). The peers 24 require the installation of a peer node application 26, which when executed, enables the peer 24 to communicate with other peers 24 and with the peer server 36 over a network, such as the Internet. Access to the central site 40 from devices or clients 32 that are not peers 24 is possible using a standard web browser 30.

The peers 24 may each represent either a website or a computer, and typically store the digital content 20 of a particular user 18. According to the present invention, digital content 20 can refer to digital images, photo albums, video clips, MP3 files, and the like. For the sake of clarity, however, the following description will refer primarily to digital images.

A peer 24 may store the digital content, e.g., images 20, of more than one user. For example, two family members that share a home PC, but manage their images 20 separately, may maintain separate accounts with the network 100 on the shared PC. The digital images 20 are stored as image files that include image data. Each image 20 also has metadata associated with it that describes and categorizes the image. The image's metadata typically includes a tag, which is designated by the user. The tag usually comprises at least one keyword that describes the image 20.

The P2P photosharing network 100 is in contrast to the traditional photosharing model where the user would post digital images by uploading the images from his or her computer to a webserver for storage in a static album. Instead, in the P2P photosharing network 100, the peers 24 maintain storage of the actual image data and only the metadata for each image 20 is uploaded to the central site 40.

In operation, users 18 become members of the P2P photosharing service 100 by downloading and installing the peer node application 26 that communicates with the server 36 and enables the user's computer to become a peer in the P2P network 100. Users 18 of the peers 24 register themselves and their peer systems 24 with the peer server 36 to become members of the service. A user 18 may share images 20 that are local on the user's peer 24 with others by uploading image metadata, including tags, which synchronizes the peer 24 and the peer server 36.

The central site 40 collects image metadata for images 20 on each of the peers 24 and enables users 18 to find images of interest by their tags. Generally, a user 18 can submit a query containing a search criteria. The peer server 36 processes the query, and retrieves and returns a list of images 20 having tags that match the search criteria. A user 18 can then review each image on the list to find images of interest. The images 20 selected from the list by the user 18 are downloaded to the user's peer 24 directly from the peer 24 hosting the images 20.

While tags can provide an effective way of categorizing the images at the central site 40, problems can arise when numerous images have a tag associated with a common keyword, such as "dogs" or "cats." If the tag is common, the number of images 20 retrieved by the peer server 36 can be very large. The user 18 must view each image 20 in order to find images of interest. This can be a tedious process, particularly if the user 18 is interested in seeing new images in the network 100. In that situation, because the peer server 36 is unable to differentiate between new or old tags, the peer server 36 simply retrieves every image 20 that has a tag that matches the query regardless of the tag's age. Thus, the user 18 must wade through old images 20 in order to find newly uploaded images with newly created tags.

Moreover, if the user 18 submits a query that has a search criteria that is too narrow, or chooses search terms that are synonymous with, but do not match, a particular keyword, the result set returned by the peer server 36 can be under-inclusive, i.e., too small. For example, suppose a first user 18 posts a photo of the New York City skyline (photo 1) and associates the keyword "New York City" with a tag to photo 1. If a second user 18 then submits a query with the keyword "Manhattan," the peer server 36 will not return photo 1 because its tag does not include the keyword "Manhattan."

Accordingly, what is needed is a method and system for allowing a user to organize categories of digital content distributed over several peers in a peer-to-peer network such that a user can select particular images from many images that are associated with the same keyword. The present invention addresses such a need.

SUMMARY OF THE INVENTION

The present invention provides a method and system for organizing categories of digital content in a peer-to-peer network. In one aspect of the present invention, tag metadata is automatically collected when a user creates a tag for digital content stored in a peer computer system. Once the tag is created and the tag metadata is collected, both the tag and the tag metadata are stored in a server that is accessible to each of the peer computer systems. Here, the tag is automatically classified by its tag metadata such that a user can access digital content based on the tag metadata.

DETAILED DESCRIPTION OF THE INVENTION

The present invention relates to distributed networks, and more particularly to a method and system for organizing tags for digital content in a peer-to-peer (P2P) network. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

According to one aspect of the present invention, a user can organize digital content distributed over several remote peers in a P2P network by creating a tag that categories the digital content. When the user creates the tag, data about the tag is automatically collected. The data relating to the tag is referred to as tag metadata. Thus, while the tag is about the digital content, the tag metadata is about the tag. So, for example, the tag metadata can include a creation timestamp, which indicates when the tag was created, and a name of (or identifier for) the tag creator or author, as well as other information about the tag, the author of the tag, and so on. The tag metadata is preferably stored with the tag in a tag server in a central location accessible by all of the peers in the P2P network. The tag server classifies the digital content by its tag and classifies the tag by its metadata. In a preferred embodiment, users are allowed to search for digital content by its tag or by the tag metadata. Furthermore, users are allowed to update and add to the tag metadata associated with a tag, including additional categories of metadata included in the tag.

Figure 2:
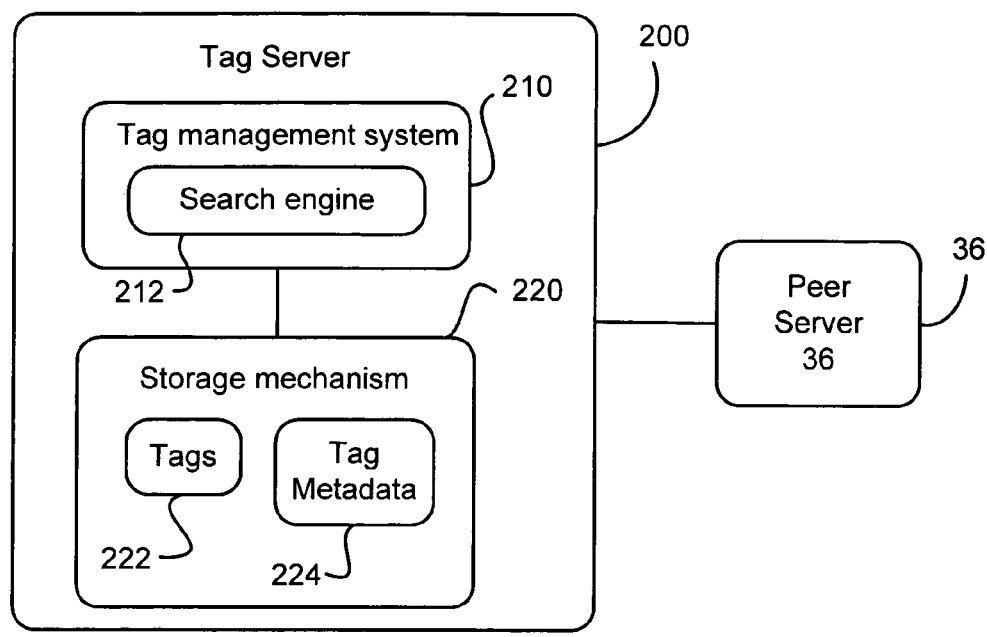
FIG. 2 is a block diagram of the central site that includes an exemplary tag server according to a preferred embodiment of the present invention.

FIG. 2 is a block diagram of the central site 40' that includes an exemplary tag server according to one embodiment of the present invention. The tag server 200 includes a tag management system 210 coupled to a storage mechanism 220 that stores the uploaded image tags 222 and the tag metadata 224. The tag management system 210 manages and maintains the information stored in the storage mechanism 220.

In one embodiment, the tag management system 210 organizes and manages the tag metadata 224 as well as the tags 222 so that the tags 222 can be classified based on the tag metadata 224. In this manner, the user can submit queries directed to the tag metadata 224. For example, the query can request tags 222 created by a certain user, or tags 222 created most recently or within a certain timeframe. In response, the search engine 212 can retrieve and return tags 222 that satisfy the criteria, together with the digital content (or a link to the digital content) to which the tags are attached.

In another embodiment, the tag management system 210 regularly determines whether a tag 222 is valid by checking its host peer 24. If the image 20 to which the tag 222 refers is no longer on the peer 24 or if the peer 24 is no longer available, the tag management system 210 will remove the tag 222 from the storage mechanism 220. In addition, if a hosting peer 24 is temporarily unavailable, e.g., it is offline, the tag management system 210 can indicate that the tag 222 is also temporarily unavailable.

Figure 1:
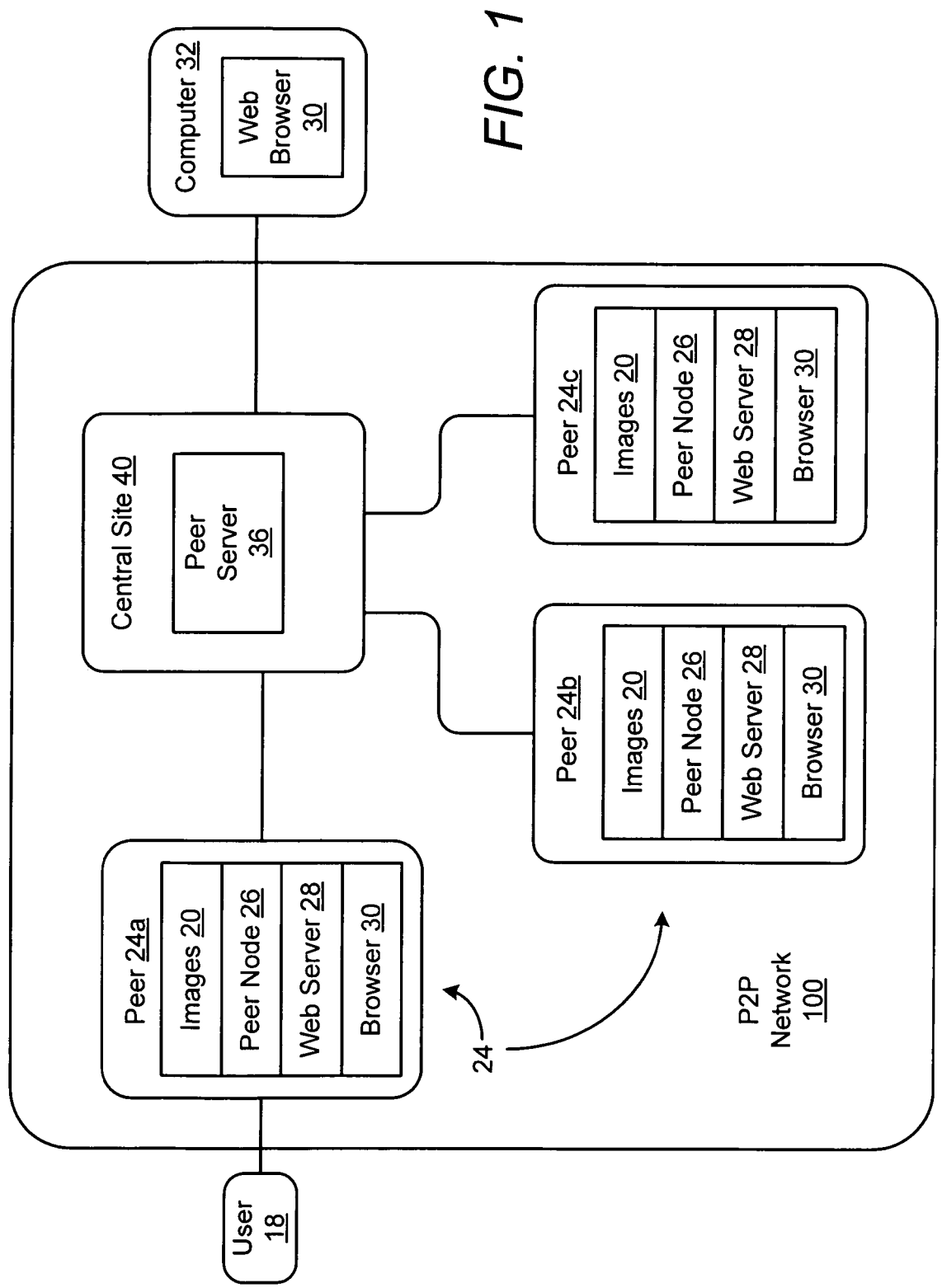
FIG. 1 is a block diagram illustrating an exemplary web-based peer-to-peer (P2P) network in accordance with a preferred embodiment.
Figure 3:
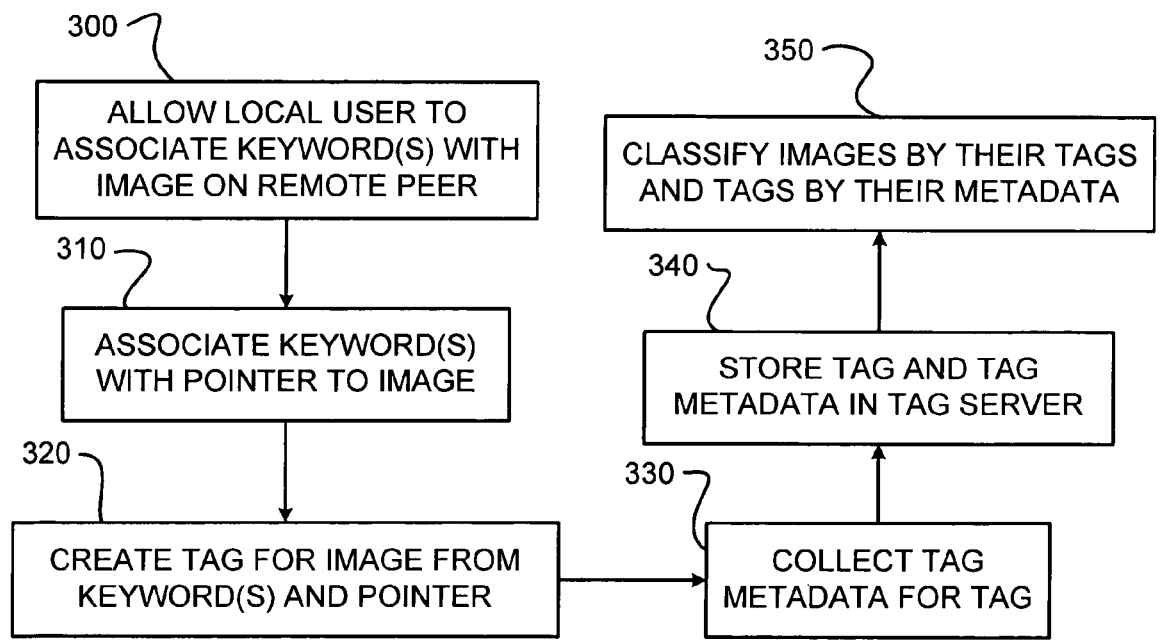
FIG. 3 is a flowchart illustrating a method for organizing digital content in a peer-to-peer network according to a preferred embodiment of the present invention.

FIG. 3 is a flowchart illustrating a process for organizing tags according to a preferred embodiment of the present invention. Referring to FIGS. 1-3, the peer node application 26 allows a user 18 to associate one or more keywords with an image 20 (step 300). The image 20 can either be stored on a local peer, e.g., 24a, or a remote peer, e.g., 24b. Accordingly, the user 18 can associate keywords with images 20 owned by the user, i.e., stored locally, or owned by others, i.e., stored remotely. In a preferred embodiment, the keywords are not unique to the image. In other words, a keyword can be used repeatedly to refer to more than one image. For example, the keyword "dog" can be associated with several images of dogs.

The peer node application 26 then associates the keywords) with a pointer to the image 20 (step 310). The pointer preferably identifies where the image 20 is stored. In one embodiment, the pointer can be the image's Uniform Resource Locator (URL).

Next, a tag 222 for the image 20 is created from at least the keyword(s) and the pointer (step 320). In a preferred embodiment, an image 20 can have more than one tag 222. For example, if the image 20 includes a dog and a cat, a first tag 222 can include the keyword "dog," a second tag 222 can include the keyword "cat," and a third tag 222 can include the keyword "animals." Each of the first, second and third tags 222 would have the same pointer because the first, second and third tags 222 refer to the same image 20.

At the same or substantially the same time the tag 222 is created, the peer node application 26 collects the tag metadata 224 for the tag 222 (step 330). In one embodiment, the peer node application 26 generates a creation timestamp for the tag 222 and records the user's name or identifier. The peer node application 26 can also collect other types of tag metadata 224 that can be useful, such as traversal count of the tag, and traversal timestamps.

Once the peer node application 26 creates the tag 222 for the image 20 and collects the tag metadata 224 for the tag 222, it uploads the tag 222 and tag metadata 224 to the tag server 200, where they are stored in the storage mechanism 220 (step 340). Here, the tag management system 210 classifies images 20 by their tags 222 and tags 222 by their metadata 224 (step 350).

In a preferred embodiment, the tag management system 210 allows the tag metadata 224 to be updated and added to after it is stored in the storage mechanism 220. In one embodiment, after the user 18 has viewed an image 20, the user 18 is allowed to submit comments regarding the quality of the tag 222. For example, the comments can indicate whether the keyword associated with the tag 222 accurately matches the digital content, and can include a rating system that allows the user to rate the quality of the tag, e.g., with numbers or stars. The tag management system 210 updates the tag metadata 224 with the comments and rating. In another embodiment, the tag management system 210 can keep track of the number of times an image 20 is viewed and when each viewing has occurred, and update the tag metadata 224 with this information.

In another embodiment, if the user 18 determines that the keyword associated with the tag 222 is related to other keywords, the tag management system 210 can allow the user 18 to associate the other related keywords with the tag 222. For example, if the user 18 is viewing an image 20 that has a tag 222 with the keyword "banana," and notices that there is a keyword called "fruit," the user 18 can associate the keyword "fruit" with the tag 222. The tag management system 210 updates the tag metadata 224 with the related keyword by, e.g., adding the keyword "fruit" to the tag metadata 224 itself.

By collecting tag metadata 224 and storing the tag metadata 224 in a central location accessible by each of the peers 24, the user 18 can perform searches based on the tag metadata 224 as well as the tag keywords. So for example, the user 18 can submit a query for tags created by a certain user 18, for highly rated tags, for newly created tags, etc. In addition, the user 18 can submit a request to sort tags by their ratings, or to see users 18 with the highest ratings, or to see the most viewed images, or to see related keywords for a tag.

In one embodiment, the user 18 can refine a keyword search by including search criteria related to the tag metadata 224. In this manner, the user 18 can significantly reduce the size of a result set, e.g. number of images 20 having tags 222 satisfying the search criteria. Accordingly, significantly less time is needed for the user to review the returned images. Alternatively, because the tag metadata can include additional keywords related to the original keyword, a user's search can automatically be expanded to capture digital content that is tagged with keywords similar to, but not the same as, the original keyword that was searched on. The search algorithm automatically infers the relationship between keywords by noting the existence of metadata in a tag that is of the type "keyword," for instance. Accordingly, images 20 the user 18 would otherwise not receive would be returned to the user 18.

The present invention provides a method and system for organizing categories of digital content in a peer-to-peer network. In a preferred embodiment, tag metadata is automatically collected when a tag is created for digital content. The tag metadata and tag are stored in a tag server that is accessible by each of the peers in the peer-to-peer network. A tag management system in the tag server classifies the digital content by its tag and classifies the tag by its metadata. By collecting and storing the tag metadata in the central location, users can perform searches for digital content distributed over the peer-to-peer network based on the tag metadata as well as the tags.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method for organizing photographs, the method comprising:
   generating, by a computer comprising a processor, a first searchable classification of a plurality of photographs based on keywords that users have designated as being associated with the plurality of photographs, the first searchable classification comprising a plurality of keyword entries, wherein each of the plurality of keyword entries comprises a corresponding keyword and at least one corresponding photograph reference, the at least one corresponding photograph reference identifying a photograph with which the corresponding keyword has been designated by a user as being associated, and wherein each keyword comprises at least one keyword metadata value;
   generating a second searchable classification of the plurality of keyword entries, the second searchable classification comprising a plurality of keyword metadata entries, wherein each of the keyword metadata entries comprises a corresponding keyword metadata value having an author metadata type and identifying an author of the corresponding keyword, and at least one corresponding keyword entry reference, the at least one corresponding keyword entry reference identifying at least one of the plurality of keyword entries in the first searchable classification based on the keyword metadata value of the corresponding keyword;
   receiving, via the computer, a request identifying a criterion comprising a user identifier;
   accessing the second searchable classification based on the user identifier to identify one or more matched keyword metadata entries of the plurality of keyword metadata entries wherein the corresponding keyword metadata value matches the user identifier;
   accessing the first searchable classification using the keyword entry references that correspond to the one or more matched keyword metadata entries to identify a plurality of matched keyword entries; and
   in response to the request, sending a plurality of photograph references that correspond to the plurality of matched keyword entries.

2. The method of claim 1, wherein the at least one keyword metadata value comprises a keyword rating type, wherein the at least one keyword metadata value identifies an average rating of the corresponding keyword based on ratings provided by a plurality of users.

3. The method of claim 1, wherein each keyword comprises at least two keyword metadata values, and wherein a first of the at least two keyword metadata values is a first metadata value type, and a second of the at least two keyword metadata values is a second metadata value type.

4. The method of claim 3, wherein the first metadata value type comprises the author metadata type and wherein the first metadata value identifies the author of the corresponding keyword, and wherein the second metadata value type comprises a creation date metadata type, and wherein the second metadata value identifies a creation date of the corresponding keyword.

5. A method for organizing keywords associated with photographs, the method comprising:

generating, by a computer comprising a processor, a first searchable classification of a plurality of photographs based on keywords that users have designated as being associated with the plurality of photographs, the first searchable classification comprising a plurality of keyword entries, wherein each of the plurality of keyword entries comprises a corresponding keyword and at least one corresponding photograph reference, the at least one corresponding photograph reference identifying a photograph with which the corresponding keyword has been designated by a user as being associated, and wherein each keyword comprises at least one keyword metadata value;

generating a second searchable classification of the plurality of keyword entries, the second searchable classification comprising a plurality of keyword metadata entries, wherein each of the keyword metadata entries comprises a corresponding keyword metadata value having an author metadata type and identifying an author of the corresponding keyword, and at least one corresponding keyword entry reference, the at least one corresponding keyword entry reference identifying at least one of the plurality of keyword entries in the first searchable classification based on the keyword metadata value of the corresponding keyword;

receiving, via the computer, a request identifying a criterion comprising a user identifier;

accessing the second searchable classification based on the user identifier to identify one or more matched keyword metadata entries of the plurality of keyword metadata entries wherein the corresponding keyword metadata value matches the user identifier;

accessing the first searchable classification using the keyword entry references that correspond to the one or more matched keyword metadata entries to identify a plurality of matched keyword entries; and in response to the request, sending a plurality of keywords that correspond to the plurality of matched keyword entries.

6. A non-transitory computer readable medium containing program instructions which, when executed by a processor, performs a method for organizing photographs, the method comprising:

generating, by a computer comprising a processor, a first searchable classification of a plurality of photographs based on keywords that users have designated as being associated with the plurality of photographs, the first searchable classification comprising a plurality of keyword entries, wherein each of the plurality of keyword entries comprises a corresponding keyword and at least one corresponding photograph reference, the at least one corresponding photograph reference identifying a photograph with which the corresponding keyword has been designated by a user as being associated, and wherein each keyword comprises at least one keyword metadata value;

generating a second searchable classification of the plurality of keyword entries, the second searchable classification comprising a plurality of keyword metadata entries, wherein each of the keyword metadata entries comprises a corresponding keyword metadata value having an author metadata type and identifying an author of the corresponding keyword, and at least one corresponding keyword entry reference, the at least one corresponding keyword entry reference identifying at least one of the plurality of keyword entries in the first searchable classification based on a keyword metadata value of the corresponding keyword;

receiving, via the computer, a request identifying a criterion comprising a user identifier;

accessing the second searchable classification based on the user identifier to identify one or more matched keyword metadata entries of the plurality of keyword metadata entries wherein the corresponding keyword metadata value matches the user identifier;

accessing the first searchable classification using the keyword entry references that correspond to the one or more matched keyword metadata entries to identify a plurality of matched keyword entries; and in response to the request, sending a plurality of photograph references that correspond to the plurality of matched keyword entries.

7. The method of claim 5, wherein each keyword comprises at least two keyword metadata values, and wherein a first of the at least two keyword metadata values is a first metadata value type, and a second of the at least two keyword metadata values is a second metadata value type.

8. The method of claim 7, wherein the first metadata value type comprises the author metadata type and wherein the first metadata value identifies the author of the corresponding keyword, and wherein the second metadata value type comprises a creation date metadata type, and wherein the second metadata value identifies a creation date of the corresponding keyword.

9. The non-transitory computer readable medium of claim 6, wherein each keyword comprises at least two keyword metadata values, and wherein a first of the at least two keyword metadata values is a first metadata value type, and a second of the at least two keyword metadata values is a second metadata value type.

10. The non-transitory computer readable medium method of claim 9, wherein the first metadata value type comprises the author metadata type and wherein the first metadata value identifies the author of the corresponding keyword, and wherein the second metadata value type comprises a creation date metadata type, and wherein the second metadata value identifies a creation date of the corresponding keyword.

* * * * *